US010909050B2

(12) United States Patent
Ouchi et al.

(10) Patent No.: US 10,909,050 B2
(45) Date of Patent: Feb. 2, 2021

(54) GATEWAY APPARATUS AND COMMUNICATION METHOD

(71) Applicant: Toyota Jidosha Kabushiki Kaisha, Toyota (JP)

(72) Inventors: Shiro Ouchi, Toyota (JP); Hiroki Keino, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/353,042

(22) Filed: Mar. 14, 2019

(65) Prior Publication Data

US 2019/0286580 A1    Sep. 19, 2019

(30) Foreign Application Priority Data

Mar. 19, 2018  (JP) ................................. 2018-051487

(51) Int. Cl.
*G06F 13/12*       (2006.01)
*B60R 16/023*    (2006.01)
*G06F 8/654*      (2018.01)
*G06F 8/65*        (2018.01)

(52) U.S. Cl.
CPC .......... *G06F 13/126* (2013.01); *B60R 16/023* (2013.01); *G06F 8/654* (2018.02)

(58) Field of Classification Search
CPC .......... G06F 13/12; G06F 8/65; F06F 13/023; B60R 16/023
USPC ........................................................ 710/6
See application file for complete search history.

(56) References Cited

U.S. PATENT DOCUMENTS

| 2003/0117298 | A1  |  6/2003 | Tokunaga et al. |
|---|---|---|---|
| 2011/0197187 | A1* |  8/2011 | Roh |
| 2017/0093866 | A1* |  3/2017 | Ben-Noon |
| 2018/0136924 | A1* |  5/2018 | Okuyama ................. G06F 8/65 |
| 2018/0152341 | A1* |  5/2018 | Maeda ............. H04L 12/40013 |
| 2018/0183605 | A1* |  6/2018 | Kawabata ............. G06F 21/572 |
| 2019/0281052 | A1* |  9/2019 | Lekkas |
| 2019/0286580 | A1* |  9/2019 | Ouchi et al. |
| 2019/0354364 | A1* | 11/2019 | Seki |
| 2019/0361696 | A1* | 11/2019 | Nakano |

FOREIGN PATENT DOCUMENTS

JP        2002016614 A       1/2002

\* cited by examiner

*Primary Examiner* — Christopher B Shin
(74) *Attorney, Agent, or Firm* — Dinsmore & Shohl LLP (57) ABSTRACT

A gateway apparatus is provided, including: a storage unit storing a plurality of different filter information pieces each including an application target ECU configuration, a filter condition indicating a condition of data allowed to be transferred to the ECU and a filter version, in a manner associated with each other; a selection unit selecting, from among the plurality of different filter information pieces, a filter information piece whose application target ECU configuration corresponds to an ECU configuration of an ECU installed in the vehicle; a notification unit notifying an information processor of a filter version included in the filter information piece selected by the selection unit; and a filter processing unit judging whether or not data received from the information processor is to be transferred to the ECU installed in the vehicle in accordance with a filter condition included in the filter information piece selected by the selection unit.

5 Claims, 8 Drawing Sheets

<CONFIGURATION INFORMATION>

| ECU CONFIGURATION | | | |
|---|---|---|---|
| | ECU TYPE | STATUS | PROGRAM Ver. |
| | BODY ECU | PRESENT | 10-00-00 |
| | BRAKE ECU | PRESENT | 20-00-00 |
| | ENGINE ECU | PRESENT | 10-00-03 |
| | METER ECU | PRESENT | 40-00-00 |
| | DRIVE ASSIST ECU | ABSENT | — |
| | ... | ... | ... |
| TARGET DESTINATION | | | |
| | JP,US,UK | | |

Fig. 6

<FILTER CONDITION FILE>

| FILTER VERSION : Ver.3 | | | |
|---|---|---|---|
| FILTER APPLICATION CONDITION | | | |
| | ECU CONFIGURATION | | |
| | ECU TYPE | STATUS | PROGRAM Ver. |
| | BODY ECU | PRESENT | 10-00-00 |
| | BRAKE ECU | PRESENT | 20-00-00 |
| | METER ECU | PRESENT | 40-00-00 |
| | TARGET DESTINATION | | |
| | JP,US,UK | | |
| | START OF APPLICATION (DATE AND TIME) - END OF APPLICATION (DATE AND TIME) | | |
| | 2017.10.1 0:00 ~ 2020.10.1 23:59 | | |
| FILTER CONDITION (TRANSFER ALLOWED ONLY WHEN THE FOLLOWING CONDITIONS ARE SATISFIED) | | | |
| | FRAME NAME (DATA NAME) | VALID VALUE | TRANSMISSION CYCLE | DYNAMIC CONDITION |
| | XXXXXX[AAAA] | 0x00~0xFF | 100msec | VEHICLE BEING STOPPED |
| | XXXXXX[BBBB] | 0x0~0x1E | 10msec | VEHICLE TRAVELING |
| | YYYYYY[CCCC] | 0x00~0xFF | — | — |
| | ZZZZZZ[DDDD] | 0x0000~0x0FFF | 24msec | VEHICLE BEING STOPPED |

GATEWAY APPARATUS AND COMMUNICATION METHOD

CROSS-REFERENCE TO RELATED APPLICATION

This application relates to and claims priority from Japanese Patent Application No. 2018-051487, filed on Mar. 19, 2018, the entire disclosure of which is incorporated herein by reference.

BACKGROUND

Field

The present disclosure relates to a gateway apparatus and a communication method.

Description of Related Art

Recently, a study has been made of a type of vehicle called a "connected car," which includes an in-vehicle communication device. Connected cars receive various types of data generated in a datacenter and perform various types of processing based on the received data. JP2002-016614 A discloses an in-vehicle gateway apparatus that eliminates, from among the data received by a vehicle, the transfer of unnecessary data in order to prevent processing of data which is undesirable in terms of safety and security.

In order to address the evolutions of functions fulfilled in connected cars and data centers, studies have been made to develop a connected car capable of changing the configuration of its ECU online or offline (such as rewriting of a program or addition of an ECU), and to distribute data from the data center with a protocol corresponding to the configuration of the ECU.

Since a connected car receives and transmits data to and from a data center via wireless communication, the connected car has a risk of introducing improper data therein. Thus, it is desirable to filter received data using a gateway before being transferred to an ECU in order to prevent improper data from reaching the ECU. On the other hand, since online or offline changes in the configuration of an ECU may change the protocol of data transmitted from the data center, it becomes necessary to provide a mechanism capable of appropriately changing the filtering processing in a gateway in accordance with the changes in the configuration of the ECU.

However, since the technique disclosed in JP2002-016614 A does not assume such circumstances, it is not possible to change the filtering processing performed in the gateway in accordance with the configuration of the ECU.

SUMMARY

An object of the present disclosure is to provide a technique that allows for filtering of various types of data in accordance with the configurations of ECUs.

An aspect of the present disclosure provides a gateway apparatus installed in a vehicle, the gateway apparatus transferring data received from an information processor to an ECU, the gateway apparatus including: a storage unit that stores a plurality of different filter information pieces each including an application target ECU configuration, a filter condition indicating condition of data allowed to be transferred to the ECU and a filter version, in a manner associated with each other; a selection unit that selects, from among the plurality of different filter information pieces, a filter information piece whose application target ECU configuration corresponds to an ECU configuration of an ECU installed in the vehicle a notification unit that notifies the information processor of a filter version included in the filter information piece selected by the selection unit; and a filter processing unit that judges whether or not data received from the information processor is to be transferred to the ECU installed in the vehicle in accordance with a filter condition included in the filter information piece selected by the selection unit.

DETAILED DESCRIPTION

An embodiment of the present disclosure will be described below with reference to the attached drawings. In each drawing, like reference numerals denote the same or similar configurations.

System Configuration

Figure 1:
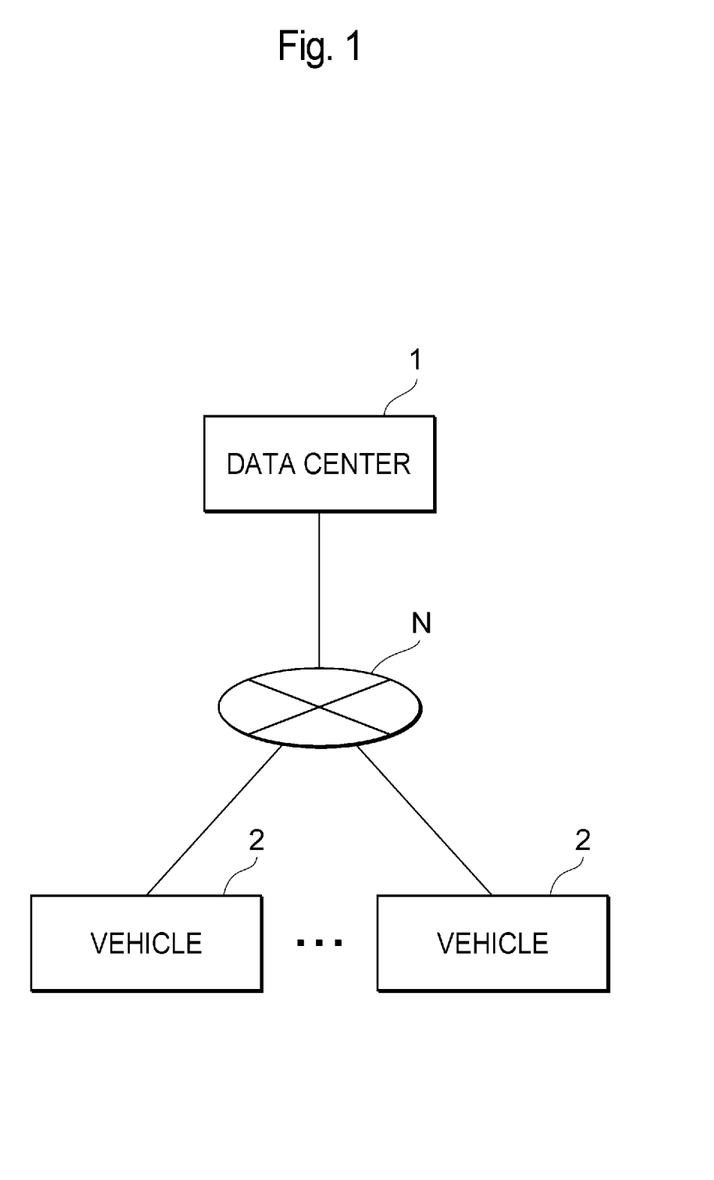
FIG. 1 is a diagram showing a configuration example of a data distribution system according to an embodiment.

FIG. 1 is a diagram showing a configuration example of a data distribution system according to an embodiment. The data distribution system includes a data center 1 and vehicles 2. The data center 1 and the vehicles 2 can communicate with each other via a communication network N. Although FIG. 1 shows a plurality of vehicles 2, the number of vehicles included in the data distribution system is not limited.

The data center 1 generates data (hereinafter referred to as "distribution data") to be distributed to each vehicle 2 and distributes the generated data to each vehicle 2. The distribution data may include any type of data, examples of which may include: data obtained by statistically analyzing probe information (vehicle traveling information) transmitted from devices provided in side strips, etc. and from a great number of vehicles 2; and data required for assisting automated driving.

More than one version of the distribution data has been prepared in accordance with the ECU configurations of each vehicle 2. Further, the data center does not transmit the same version of the distribution data to all the vehicles 2, but transmits a version of the distribution data which is suitable for the ECU configuration of each vehicle 2. Examples of different versions of the distribution data may include a version of the distribution data suitable for a vehicle 2 with an ECU only having a function of performing simple automated driving, a version of the distribution data suitable for a vehicle 2 with an ECU having a function of performing advanced automated driving, and others.

The vehicle 2 uses distribution data received from the data center 1 to perform various types of processing as a connected car. Since the vehicle 2 has to receive distribution data suitable for its own ECU configuration, the vehicle 2 has a function of notifying the data center 1 of a version of distribution data that the vehicle 2 desires to receive. The vehicle 2 also has a gateway (a multi-protocol GW to be described later) for performing processing (filtering processing) for transferring only authorized distribution data, which has been distributed from the data center 1, to the ECU in order to prevent improper data from entering the ECU. Although the vehicle 2 may be, for example, an automobile, any vehicle may be employed as long as the vehicle can receive data from the data center 1. For example, the vehicle 2 may be a motorcycle.

Figure 2:
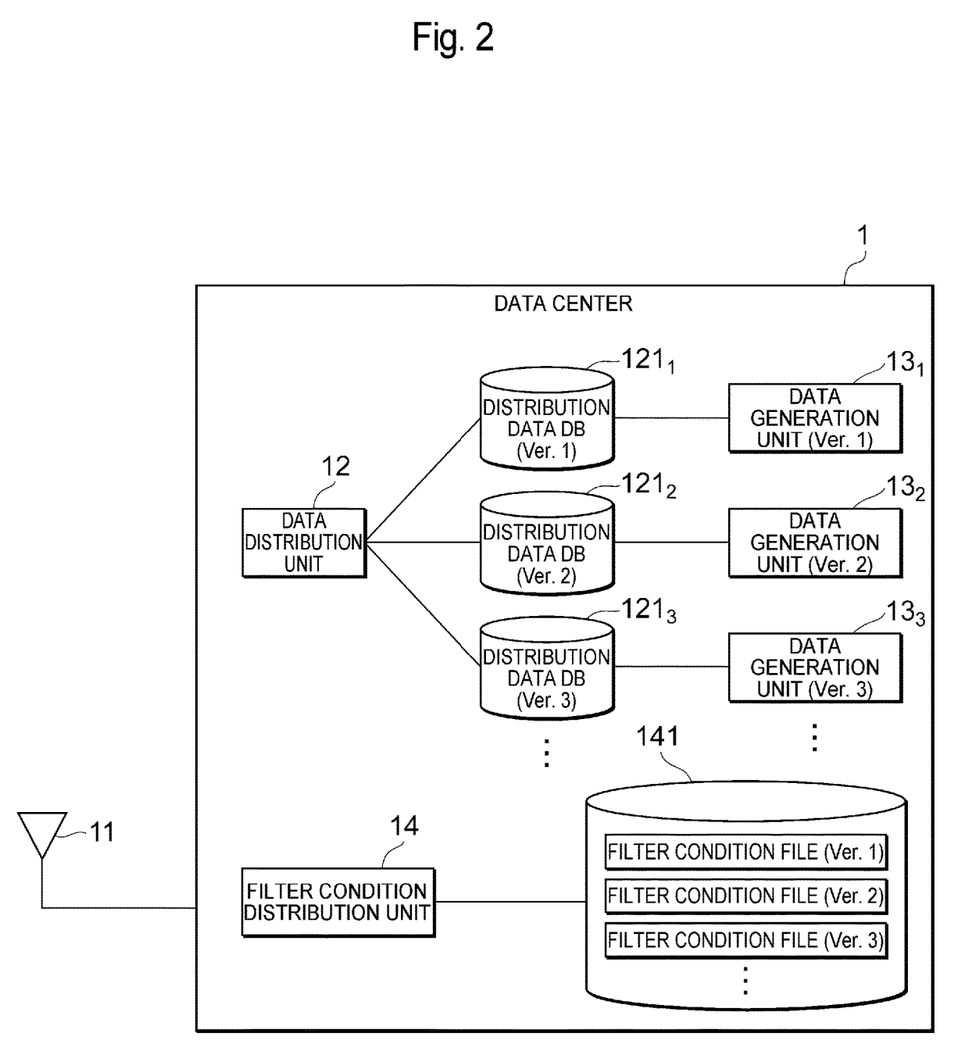
FIG. 2 is a diagram showing a configuration example of a data center.

FIG. 2 is a diagram showing a configuration example of a data center 1. The data center 1 includes a communication unit 11 that communicates with the vehicle 2, a plurality of data generation units 13 (a data generation unit (Ver. 1) $13_1$, a data generation unit (Ver. 2) $13_2$ and a data generation unit (Ver. 3) $13_3$,) that generates distribution data, a plurality of distribution data OBs 121 (a distribution data DB (Ver. 1) $121_1$, a distribution data DB (Ver. 2) $121_2$ and a distribution data DB (Ver. 3) $121_3$) that stores generated distribution data, a data distribution unit 12 that distributes the distribution data to each vehicle 2, a filter condition distribution unit 14, and a filter DB 141. A single data generation unit 13 and a single distribution data DB 121 are provided for each version of distribution data.

The data center 1 may be configured from a single server or a plurality of servers in combination. The data center 1 may alternatively be referred to as an "information processor." The communication unit 11 the data distribution unit 12, the data generation unit 13 and the filter condition distribution unit 14 can be implemented by executing, by a processor included in the data center 1, a program stored in a memory or a storage device. The program may be stored in a storage medium. The storage medium storing such program may be a non-transitory storage medium, Examples of the non-transitory storage medium, may include, but are not particularly limited to, a USB memory and a CD-ROM. The distribution data DBs 121 and the filter DB 141 can be implemented using the memory or storage device included in the data center 1.

The data generation unit 13 generates distribution data and stores the generated distribution data in the distribution data DB 121. In the example shown in FIG. 2, the data generation unit (Ver. 1) $13_1$ generates distribution data (Ver. 1), the data generation unit (Ver. 2) $13_2$ generates distribution data (Ver. 2) and the data generation unit (Ver. 3) $13_3$ generates distribution data (Ver. 3). The generated distribution data (Ver. 1), distribution data (Ver. 2) and distribution data (Ver. 3) are stored in the distribution data DB (Ver. 1) $121_1$, the distribution data DB (Ver. 2) $121_2$ and the distribution data DB (Ver. 3) $121_3$, respectively.

The filter condition distribution unit 14 transmits a filter condition file (to be described later) to the vehicle 2. The filter DB 141 stores the filter condition file.

In the present embodiment, there may be a plurality of data centers 1. For example, there may be a plurality of data centers 1 having the same function. Alternatively, a data center 1 that distributes the filter condition file and a data center 1 that distributes the distribution data may exist separately.

Figure 3:
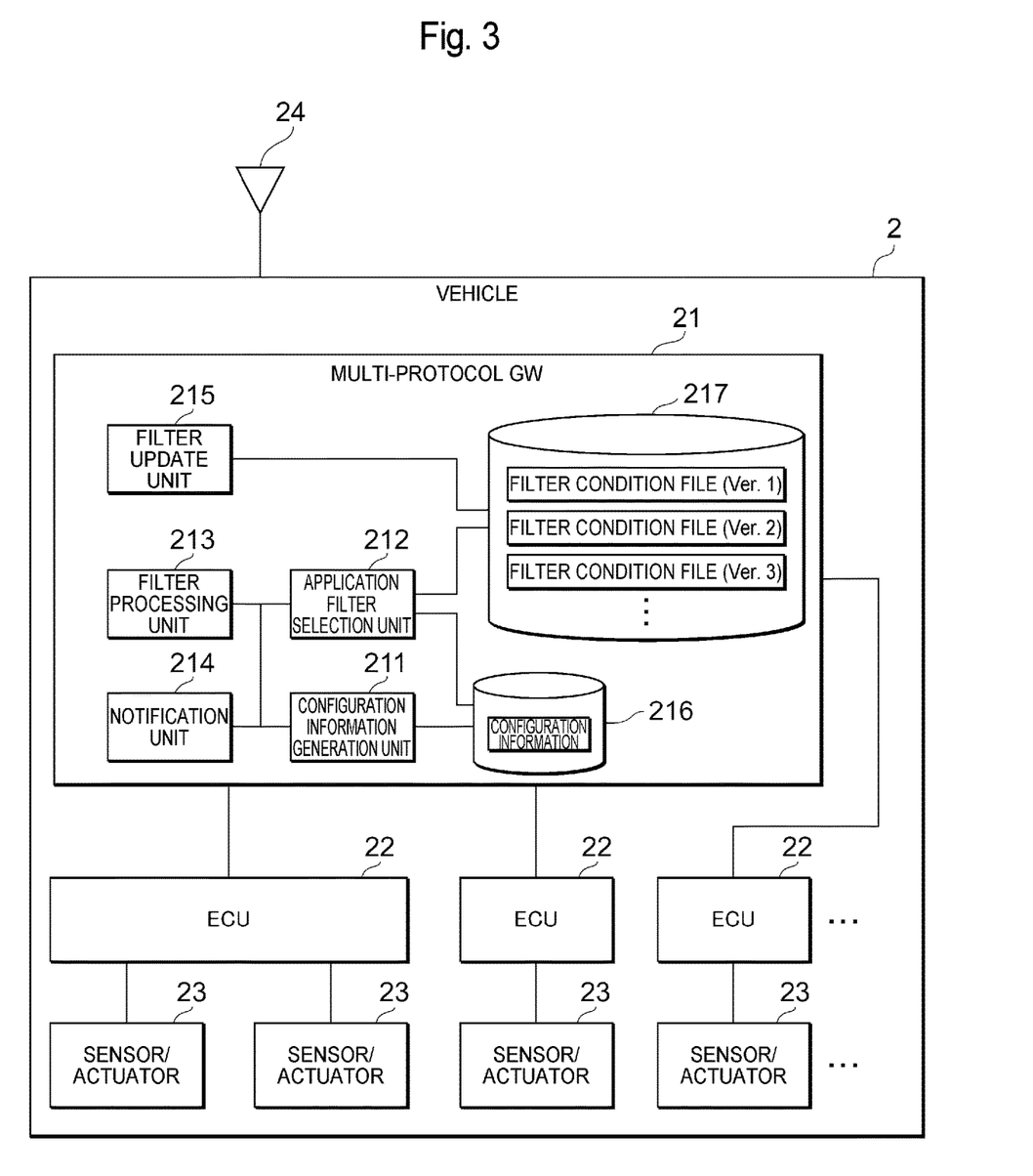
FIG. 3 is a diagram showing a configuration example of vehicle.

FIG. 3 shows a configuration example of a vehicle. The vehicle 2 includes a multi-protocol GW (GateWay) 21, a plurality of ECUs 22, one or ore sensors/actuators 23 connected to each ECU 22, and a communication unit 24 that communicates with the data center 1. Each ECU 22 performs various types of processing based on the distribution data received from the data center 1. The multi-protocol GW 21 may alternatively be referred to as a "gateway apparatus."

The multi-protocol GW 21 includes a configuration information generation unit 211, an application filter selection unit 212, a filter, processing unit 213, a notification unit 214, a filter update unit 215, a configuration information storage unit 216 and a filter storage unit 217. The multi-protocol GW21 may be implemented using, for example, an ASIC (Application Specific Integrated Circuit), an FPGA (Field-Programmable Gate Array), etc.

The distribution data is transmitted from the data center 1 to each vehicle 2 using a protocol suitable for the ECU 22 configuration included in each vehicle 2. The ECU 22 configuration is uniquely defined by the type of each ECU 22 (e.g. an engine ECU, a drive assist ECU, etc.) included in the vehicle 2 and by the program version of each ECU 22.

The multi-protocol GW 21 stores, in the filter storage unit 217, one or more different filter condition files (in the example of FIG. 3, the filter condition file (Ver. 1), the filter condition file (Ver. 2) and the filter condition file (Ver. 3)), in which an application target ECU 22 configuration, a filter version and filter conditions indicating a condition of data allowed to be transferred to each ECU 22 are associated with each other. The filter condition file (Ver. 1) indicates a filter condition file with its filter version being 1. Similarly, the filter condition file (Ver. 2) indicates a filter condition file with its filter version being 2 and the filter condition file (Ver. 3) indicates a filter condition file with its filter version being 3. The filter condition file may alternatively be referred to as "filter information." The filter storage unit 217 may alternatively be referred to as a "storage unit" It should be noted that the filter condition files (Ver. 1-Ver. 3) stored in the filter DBs 141 of the data center 1 shown in FIG. 2 are the same as the respective filter condition files (Ver. 1-Ver. 3) shown in FIG. 3.

The versions of distribution data distributed from the data center 1 to the vehicle 2 are associated, one by one, with the filter condition files to be applied to the multi-protocol GW 21. Specifically, the filter condition file to be applied when the distribution data (Ver. 1) is received is the filter condition file (Ver. 1). Similarly, the filter condition file to be applied when the distribution data (Ver. 2) is received is the filter condition file (Ver. 2), and the filter condition file to be applied when the distribution data (Ver. 3) is received is the filer condition file (Ver. 3).

The configuration information generation unit 211 generates, when the vehicle 2 is activated, configuration information indicating the configuration of the ECU 22 which the vehicle 2 has, and stores the generated configuration information in the configuration information storage unit 216. The configuration information stores the types and program versions of the respective ECUs 22 installed in the vehicle 2.

The application filter selection unit 212 grasps the ECU 22 configuration of the ECU 22 installed in the vehicle by referring to the configuration information generated by the configuration information generation unit 211 when the vehicle 2 is activated. The application filter selection unit 212 selects a filter condition file corresponding to the ECU 22 configuration it has grasped by referring to the configuration information, form among a plurality of different filter condition files stored in the filter storage unit 217. Further, the application filter selection unit 212 obtains the selected filter condition file from the filter storage unit 217 and passes the obtained filter condition file to the filter processing unit 213.

The filter processing unit 213 performs processing for judging whether or not the distribution data received from the data center 1 via the communication unit 24 is transferred to each ECU 22 based on the filter condition included in the filter condition file selected by the application filter selection unit 212. The filter processing unit 213 transfers, to each ECU 22, the distribution data that has been judged as being suitable to be transferred, and discards the distribution data that has been judged as not being suitable to be transferred without transferring it to each ECU 22.

The notification unit 214 performs processing for notifying the data center 1 of a filter version included in the filter condition file selected by the application filter selection unit 212 when the vehicle 2 is activated. For example, when the filter condition file selected by the application filter selection unit 212 is the filter condition file (Ver. 3), the notification unit 214 notifies the data center 1 of the version 3 as the filter version, With such configuration, the data center 1 can transmit, to the vehicle 2, the distribution data (Ver. 3) suitable for the ECU configuration of the vehicle 2.

Meanwhile, the functions fulfilled in a connected car are deemed to be evolved faster than the replacement timing for the vehicle 2. Thus, in the present embodiment, the ECU 22 configuration is configured to be chargeable by rewriting the program of the ECU 22 online or offline and a new version of distribution data suitable for the post-change ECU configuration can be transmitted from the data center 1 to the vehicle 2, it should be noted that the offline rewriting refers to the rewriting of a program by directly connecting the ECU 22 to a program rewriting tool in a plant or at a vehicle dealership. The online rewriting refers to the rewriting of a program by using an OTA (Over The Air) technique in which the program is re-written by remote control via wireless communication.

In order for a vehicle 2 to receive a new version of distribution data, the vehicle 2 has to hold a filter condition file corresponding to the new version. Thus, when a new version of the filter condition file is added to the filter DB 141, the filter condition distribution unit 14 in the data center 1 distributes such new version of the filter condition file to each vehicle 2. The filter update unit 315 in each vehicle 2 receives the distribution of the new version of the filter condition file from the data center 1 and stores the received new version of the filter condition file in the filter storage unit 217.

With such configuration, the filter processing unit 21 of the vehicle 2 becomes able to use the new version of the filter condition file according to the updated ECU 22 configuration, as well as being able to receive distribution data suitable for the updated ECU 22 configuration, without discarding any distribution data.

Processes

Figure 4:
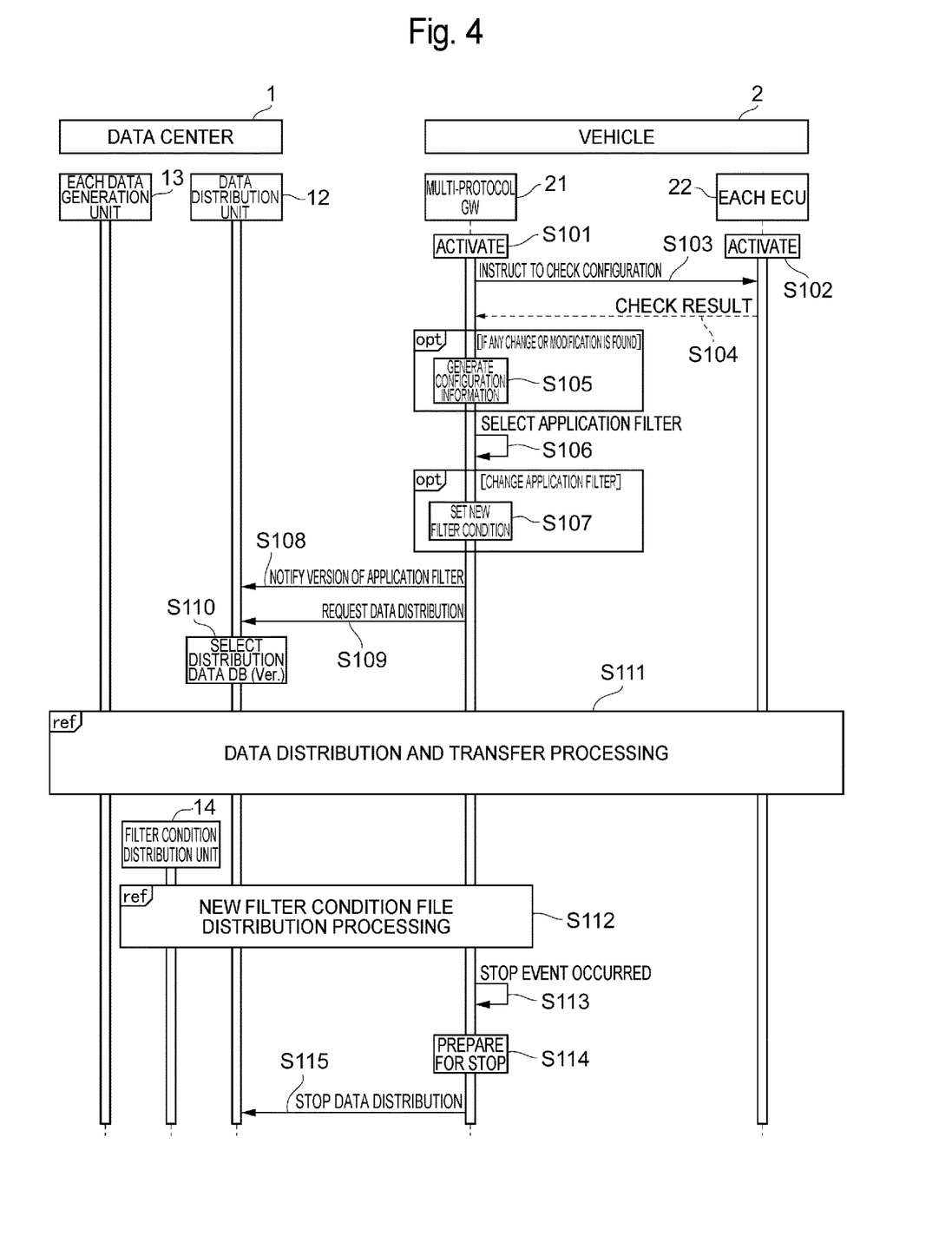
FIG. 4 is a sequence diagram showing an example of processes performed by the data distribution system according to an embodiment.

FIG. 4 is a sequence diagram showing an example of the processes performed by the data distribution system according to an embodiment. A sequence of the processes performed from when the key of the vehicle 2 is turned on until it is turned off will be described below, with reference to FIG. 4.

In step S101 and step S102, when a driver of the vehicle 2 turns on a key of the vehicle 2 to start an engine, electric power is supplied to various electronic devices installed in the vehicle 2. As a result, the multi-protocol GW 21 and each ECU 22 are activated.

In step S103, the configuration information generation unit 211 in the multi-protocol GW 21 instructs each ECU 22 installed in the vehicle to check its own configuration and notify the multi-protocol GW 21 of the configuration.

In step S104, each ECU 22 checks its own configuration and notifies the multi-protocol GW 21 of the check result. For example, each ECU 22 may be configured to notify a program version as the check result. Further, the ECU 22 managing a target destination of the vehicle 2 may be configured to notify the multi-protocol GW 21 of the target destination of the vehicle 2 in addition to the program version.

In step S105, the configuration information generation unit 211 of the multi-protocol GW 21 compares the check result notified by each ECU 22 with configuration information which has already been stored in the configuration information storage unit 216 to check whether or not the configuration of each ECU 22 installed in the vehicle 2 has changed. If any change is found, the configuration information generation unit 211 generates new configuration information after the change and stores the new configuration information in the configuration information storage unit 216. If no change is found, the process proceeds to step S106.

Figure 5:
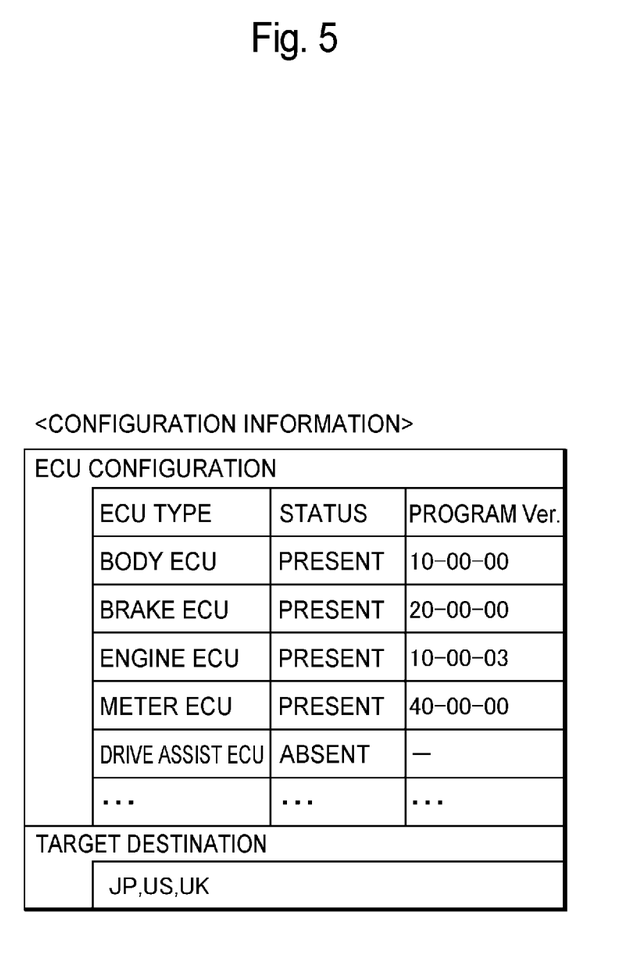
FIG. 5 is a diagram showing a specific example of configuration information.

FIG. 5 is a diagram showing a specific example of the configuration information. The configuration information is constituted by the "ECU configuration," indicating the configuration of the ECU 22 actually installed in the vehicle 2, and a "target destination," indicating a country to which the vehicle 2 is to be shipped (i.e., a country where the vehicle 2 is to be used). The "ECU configuration" is constituted by three attributes including an "ECU type," a "status" and a "program Ver." The "ECU type" indicates the type of the ECU22 installed in the vehicle 2. The "status" indicates whether or not the ECU22 designated by the ECU type is actually being installed in the vehicle 2. The "program Ver." indicates the program version of the ECU 22. In the example of FIG. 5, the ECU 22 configuration of the vehicle 2 is constituted by a body ECU having a program version of 10-00-00, a brake ECU having a program version of 20-00-00, an engine ECU having a program version of 10-00-03, and a meter ECU having a program version of 40-00-00. The configuration information further indicates that the vehicle 2 is designed for Japan, America and Britain. Each item in the configuration information shown in FIG. 5 is merely an example and the configuration information is not limited to such example. For example, the configuration information may not include a the "target destination."

Examples of situations where any change is made to the configuration information may include a situation where a program of an ECU 22 is updated online or offline to a new version of the program, a situation where the ECU 22 is replaced with an ECU having a different version of the program (including an older version of the program) due to a failure or the like of the ECU 22, and a situation where a new type of ECU 22 is installed in the vehicle 2 in order to add a new function (e.g., a situation where a new drive assist ECU 22 is additionally installed in the vehicle 2 in order to enable the vehicle 2 to provide advanced automated driving). Referring back to FIG. 4, further description will be provided below.

In step S106, the application filter selection unit 212 selects a filter condition file having a filter application condition that matches the configuration information stored in the configuration information storage unit 216 from among the filter condition files stored in the filter storage unit 217. For example, the application filter selection unit 212 may be configured to select a filter condition file having an application target ECU 22 configuration that matches the configuration of the ECU 22 of the vehicle 2 or to select a filter condition file having an application target ECU 22 configuration and a target destination that respectively match the ECU 22 configuration and target destination of the vehicle 2. In addition, the application filter selection unit 212 may be configured to select a filter condition file that meets a valid period (i.e., the current time does not expire the valid period). The valid period will be described later)

The application filter selection unit 212 judges whether or not the selected filter condition file contains the same filter condition as the filter condition which has already been applied to the filter processing unit 213 (i.e., the filter condition which has been applied to the filter processing unit 213 since the last activation of the vehicle 2). If the elected filter condition file contains the same filter condition, the process in step S107 is omitted and the process proceeds to step S108. If the selected filter condition file contains a different filter condition, the application filter selection unit 212 notifies the filter processing unit 213 of the selected filter condition file and the process proceeds to step S107.

Figure 6:
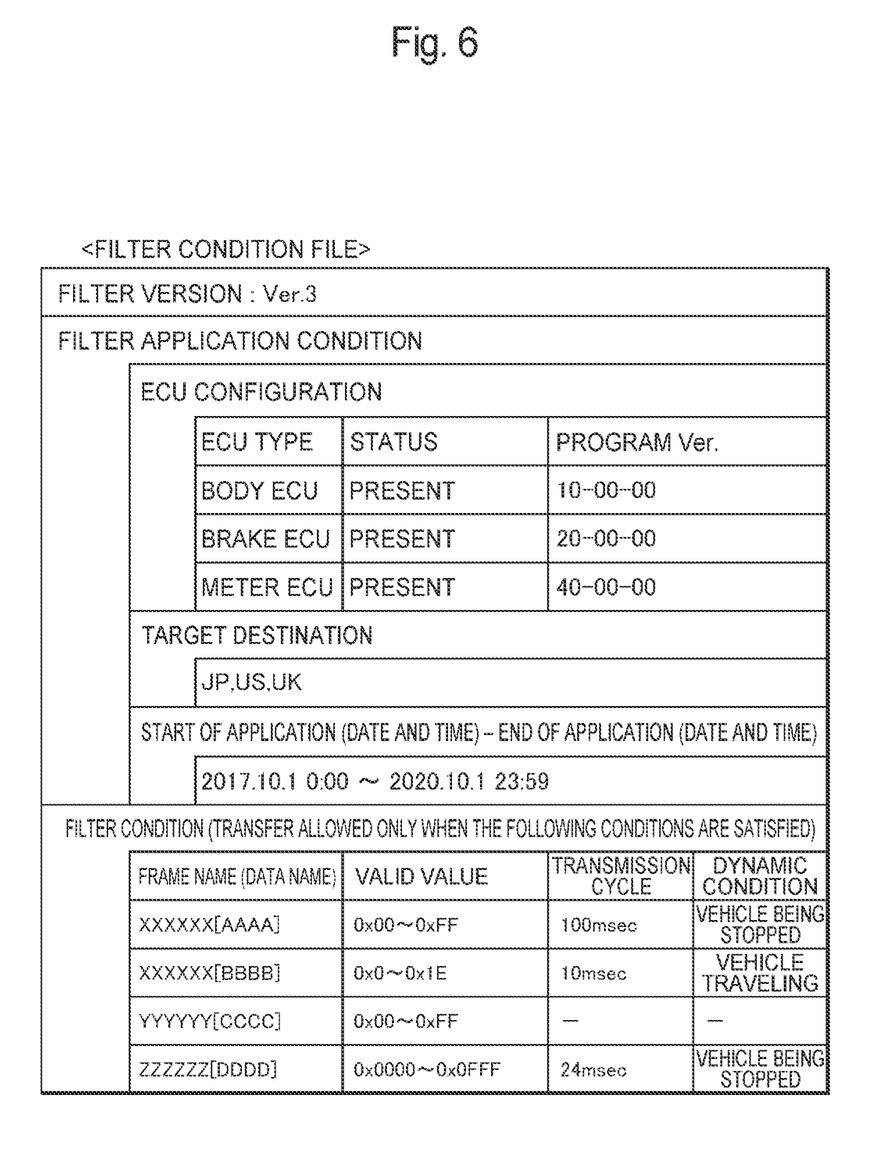
FIG. 6 is a diagram showing a specific example of a filter condition file.

FIG. 6 is a diagram showing a specific example of a filter condition file. FIG. 6 shows the filter condition file (Ver. 3) as a specific example. The filter condition file is constituted by a "filter version," "a filter application condition" and a "filter condition."

The "filter version" stores filter versions (in this example, Ver. 3). The "filter application condition" is constituted by three attributes including the "ECU configuration," "target destination" and "date and time of the start of application to date and time of the end of application." The "ECU configuration" is constituted by three attributes including the "ECU type," "status" and "program Ver." The "date and time of the start of application to date and time of the end of application" indicates the valid period of the filter condition file and stores the date and time when the application (use) of the filter condition file is allowed and the date and time the application (use) ends.

The example of FIG. 6 indicates that the filter condition file (Ver. 3) is applied when; the vehicle 2 that has an ECU 22 configuration having a body ECU with its program version being 10-00-00, a brake ECU with its program version being 20-00-00 and a meter ECU with its program version being 40-00-00; the vehicle 2 is designed for Japan, America and Britain (target destinations); and the current time is within the time period from 0:00 on Oct. 1, 2017 to 0:00 on Oct. 1, 2020. It should be noted that each item in the "filter application condition" is merely an example and the filter application condition is not particularly limited. For example, the "target destination" and/or "date and time of the start of application to date and time of the end of application" may be omitted.

The "filter condition" further includes a "frame name (data name)," a "valid value," a "transmission cycle" and a "dynamic condition." The "frame name (data name)" is information indicating the frame name and data name of the distribution data to be transferred. The "frame name (data name)" does not necessarily have to be the name of the data itself but may be expressed by, for example, a bit string included in a header. The "valid value" indicates the range of values to be transferred from among values stored in a data portion of the data specified by the frame name and data name. The "transmission cycle" indicates a cycle in which distribution data is transmitted from the data center 1. The "dynamic condition" indicates whether the distribution data is transferred only when the vehicle 2 is being stopped, or transferred only when the vehicle 2 is travelling, or transferred regardless of whether the vehicle 2 is being stopped or travelling.

For example, the example shown in FIG. 6 indicates that the distribution data having the frame name (data name) of "XXXXXX (BBBB)" stores data of 0x0 to 0x1E in its data portion, the transmission cycle from the data center 1 is 10 msec, and such distribution data should be transferred from the multi-protocol GW 21 to the ECU 22 only when the vehicle 2 is travelling. It should be noted that each item of the "filter condition" in FIG. 6 is merely an example and such example is not intended to limit the present embodiment. The distribution data to be transferred may be specified by other items than those shown in FIG. 6. Referring back to FIG. 4, further description will be provided below.

In step S107, the filter processing unit 213 applies, to itself, the filter condition included in the filter condition file notified by the application filter selection unit 212.

In step S108, the notification unit 214 notifies the data center 1 of the filter version of the filter condition file selected by the application filter selection unit 212 in the process of step S106. In step S109, the notification unit 214 requests the data center 1 to start transmission, of the distribution data.

In step S110, the data distribution unit 12 of the data center 1 selects a distribution data DB that stores the same version of the distribution data as the filter version received in step S108. For example, when the notified filter version is Ver. 2, the data distribution unit 12 selects the distribution data DB (Ver. 2).

In step S111, the data center 1 transmits to the vehicle 2 the distribution data stored in the distribution data DB selected in step S110 and the transmitted distribution data is transferred via the multi-protocol GW 21 of the vehicle 2 to each ECU 22.

In step S112, when there is a new version of the filter condition file to be distributed to each vehicle 2, the filter condition distribution unit 14 transmits such new version of the filter condition file to each vehicle 2. If there is no such new version of the filter condition file to be distributed to each vehicle 2, the process in step S112 is omitted.

In step S113, the multi-protocol SW 21 detects that the driver has turned off the key of the vehicle 2. In step S114, the multi-protocol SW 21 performs processing for stopping the transfer of the distribution data to the ECU 22. In step S115, the notification unit 214 of the multi-protocol GW 21 requests the data center 1 to stop transmitting the distribution data.

Figure 7:
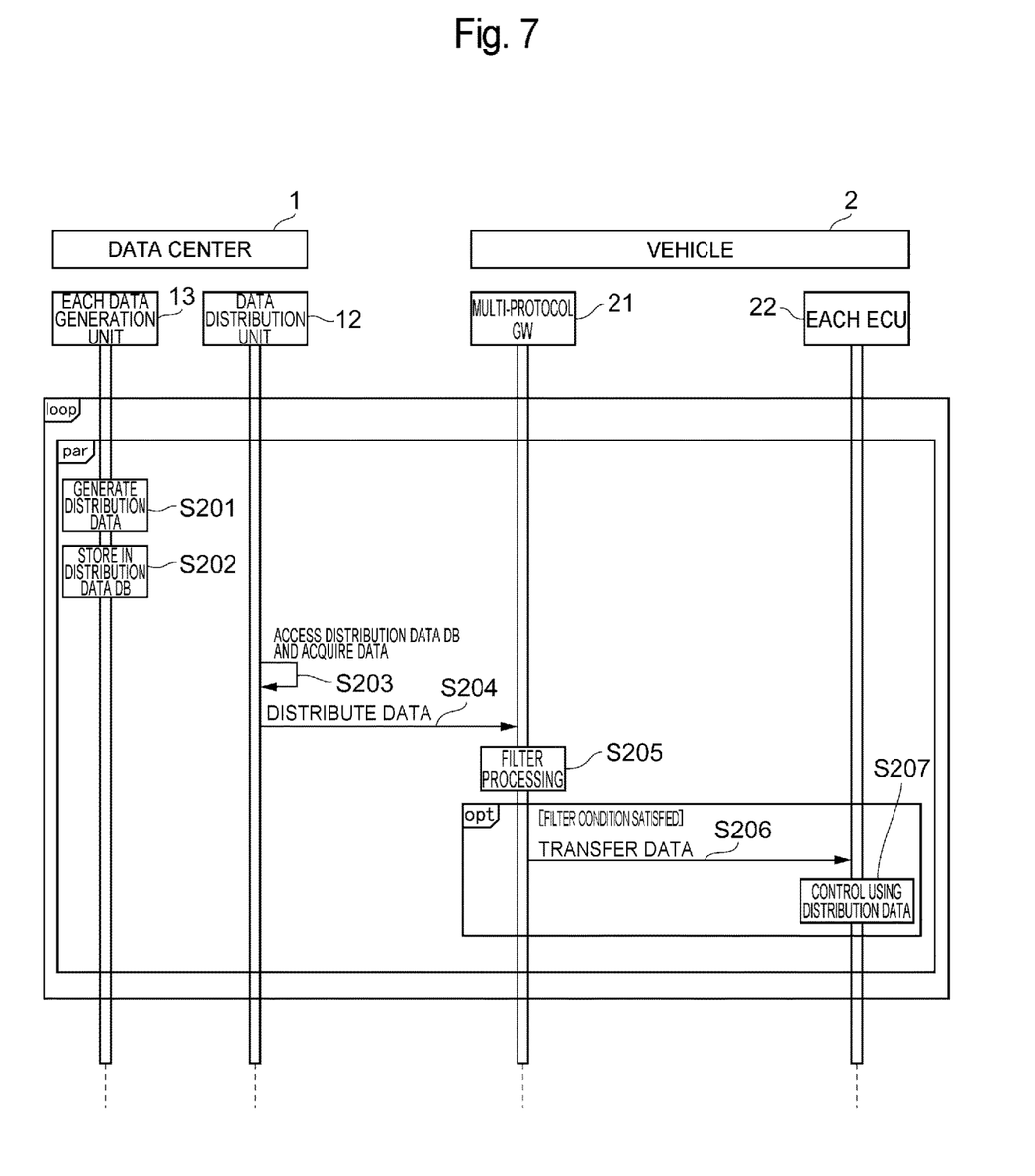
FIG. 7 is a sequence diagram showing an example of a process showing how distribution data transmitted from the data center is transferred to an ECU.

Next, the process in step S111 will be described in more detail. FIG. 7 is a sequence diagram showing an example of the process of showing how distribution data transmitted from the data center is transferred to an ECU.

In step S201 and step S202, each data generation unit 13 of the data center 1 generates distribution data to be distributed to the vehicle 2 and stores the generated distribution data in the relevant distribution data DB 121. The processes for step S201 and step S202 are performed in parallel for each version of the distribution data. For example, in the data center 1 shown in FIG. 2, the data generation unit (Ver. 1) $13_1$, the data generation unit (Ver. 2) $13_2$ and the data generation unit (Ver. 3) $13_3$ generate the distribution data (Ver. 1), the distribution data (Ver. 2) and the distribution data (Ver. 3), respectively, and store the generated distribution data in the distribution data DB (Ver. 1) $121_1$, the distribution data DB (Ver. 2) 121$_2$ and the distribution data DB (Ver. 3) 121$_3$ respectively.

In step S203 and step S204, the data distribution unit 12 obtains the distribution data to be transmitted to the vehicle 2 from the distribution data DB 121 selected in the process of step S110 shown in FIG. 4 and transmits the obtained distribution data to the vehicle 2.

In step S205 and step S206, the filter processing unit 213 of the multi-protocol GW 21 of the vehicle 2 judges whether or not the distribution data received from the data center 1 should be transferred to each ECU 22 based on the filter condition which has been applied to itself. The filter processing unit 213 transfers the distribution data that matches the applied filter condition to each ECU 22 and discards the distribution data that does not match the applied filter condition without transferring it to each ECU 22.

In step S207, each ECU 22 performs various types of control using the received distribution data. The processes from step S201 to step S207 are repeated each time the distribution data is generated by the data generation unit 13. The processes in step S201 and step S202 and the processes from step S203 to step S207 may be performed in parallel.

Figure 8:
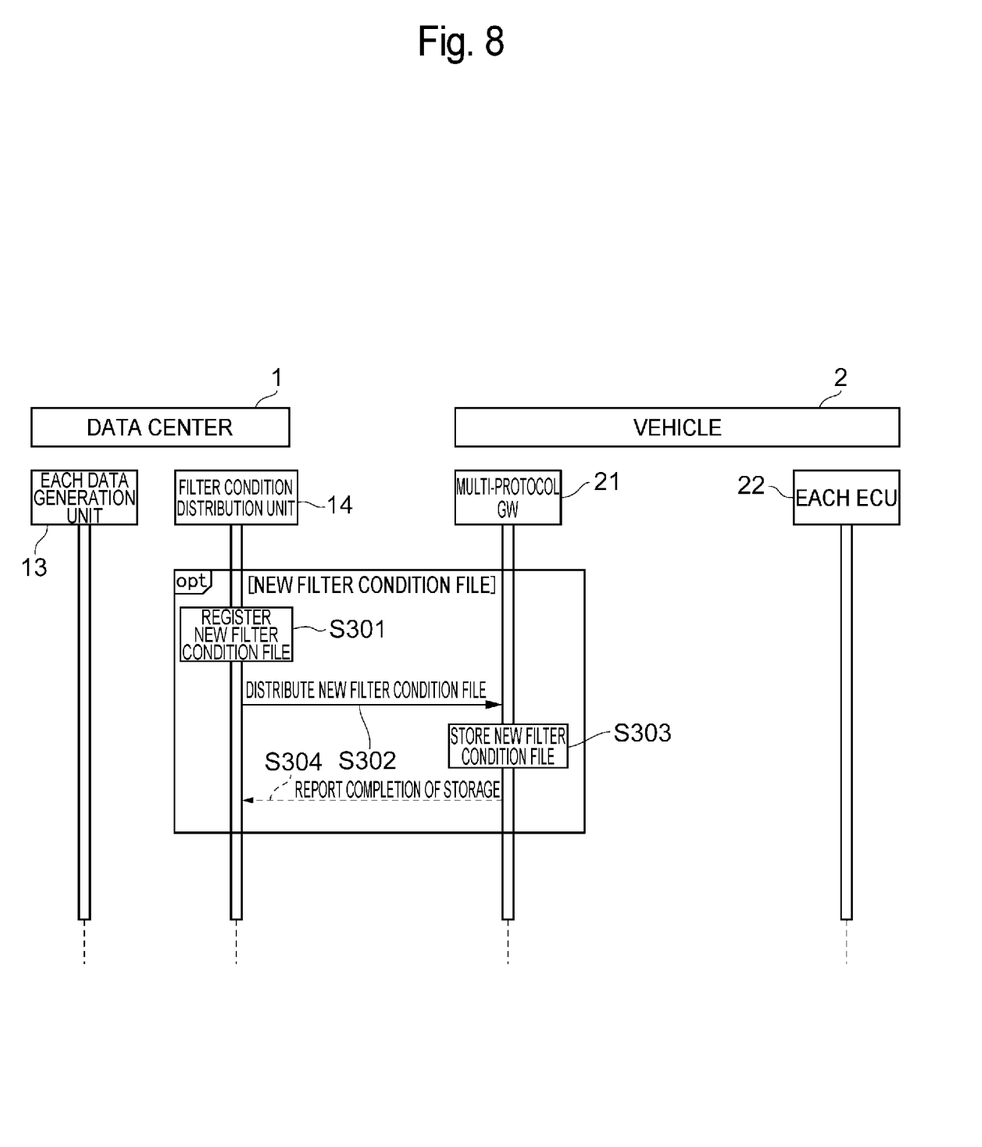
FIG. 8 is a sequence diagram showing an example of a process for distributing the filter condition file.

Next, the process in step S112 in FIG. 4 will be described in more detail below. FIG. 8 is a sequence diagram showing an example of the processes for distributing the filter condition file.

In step S301, a new filter condition file is registered to the filter DB 141 in the data center 1.

In step S302, the filter condition distribution unit 14 of the data center 1 transmits the newly-registered filter condition file to the vehicle 2.

In step S303 and step S304, the filter update unit 215 in the multi-protocol GW 21 of the vehicle 2 stores the received new filter condition file in the filter storage unit 217 and notifies the data center 1 that the storage of the new filter condition file has been completed.

For example, assuming that a filter condition file (Ver. 4) is newly registered in the filter DB 141 in the data center 1, the filter condition distribution unit 14 in the data center 1 transmits the registered filter condition file (Ver. 4) to each vehicle 2. The filter update unit 215 in each vehicle 2 stores the received filter condition file (Ver. 4) in the filter storage unit 217. As a result, if an ECU 22 configuration of a vehicle 2 is changed to a new ECU 22 configuration corresponding to the filter condition file (Ver. 4), each ECU 22 of the vehicle 2 can immediately receive distribution data (Ver. 4) suitable for the new ECU 22 configuration since the filter storage unit 217 of the vehicle 2 has already stored the filter condition file (Ver. 4).

It should be noted that the processes from step S301 to step S303 may not necessarily be performed online. For example, a new version of the filter condition file may be written offline to the filter storage unit 217 when a vehicle 2 is brought into a plant or a dealership.

Additional Notes

In the present embodiment, the multi-protocol GW 21 in the vehicle 2 is configured so as to select a filter condition file corresponding to the ECU 22 configuration of the vehicle 2 when the vehicle 2 is activated. With such configuration, it becomes possible to perform filtering for various types of distribution data n accordance with the ECU configuration and to prevent the malfunctioning, etc. of the vehicle 2 caused by improper distribution data which would otherwise have reached the ECU 22.

In the present embodiment, a plurality of filter condition files has been stored in advance in the filter storage unit 217 instead of obtaining a filter condition file corresponding to the ECU 22 configuration from the data center 1 each time the vehicle 2 is activated. Further, a new filter condition file is distributed from the data center 1 to each vehicle 2. With such configuration, even when the ECU 22 configuration is changed after a replacement of the ECU 22 due to its failure, etc. or a version upgrade of a program in the ECU 22, is possible to immediately apply, to the multi-protocol GWE21, a filter condition corresponding to the post-change ECU 22.

For example, the following description assumes that, in a situation where there are a data center 1 for distributing filter condition files and a data center 1 for distributing distribution data including data about side strips, when a vehicle 2 is started after a change in the ECU 22 configuration, the vehicle 2 cannot communicate with the data center 1 for distributing the filter condition files but can communicate with the data center 1 for distributing the distribution data, including data about side strips. In such case, if the vehicle 2 is configured so as to download a filter condition file from the data center each time the vehicle 2 is activated, the multi-protocol GW 21 cannot obtain a filter condition file corresponding to the post-change ECU 22 configuration and therefore cannot receive distribution data including the data about side strips and transfer such data to the ECU 22. However, in the present embodiment, since the multi-protocol GW 21 can obtain the filter condition file corresponding to the post-change ECU 22 directly from the filter storage unit 217, it is possible to appropriately transfer the distribution data including the data about side strips to the ECU 22.

In the present embodiment, the content of the filtering processing that should be performed by the filter processing unit 213 in the multi-protocol SW 21 is defined by the filter conditions included in the filter condition file. With such configuration, the program itself of the multi-protocol GW 21 can be configured to be non-rewritable and it is therefore possible to ensure the robustness of the multi-protocol GW 21 as compared to a multi-protocol GW 21 of a type that changes the content of the filtering processing by rewriting a program itself in the multi-protocol GW 21.

The embodiments described above are provided to aid in the easier understanding of the present disclosure and are not intended to limit the interpretation of the present disclosure. The flowcharts and sequences described in the embodiments, as well as each element included in the embodiments and its arrangement, material, condition, shape, size, etc., are not limited to those illustrated in the embodiments and may be modified as appropriate. Further, the components described in different embodiments may be partially replaced with one another or combined with one another.

According to the present disclosure, it is possible to provide a technique capable of filtering various types of data in accordance with the configurations of ECUs.

What is claimed:

1. A system comprising:
    a gateway apparatus installed in a vehicle, the gateway apparatus transferring distribution data received from an information processor to an ECU, the gateway apparatus comprising:
        a storage unit that stores a plurality of different filter information pieces each including an application target ECU configuration including a program version of the ECU, a filter condition indicating a condition to be satisfied for the distribution data to be transferred to the ECU and a filter version of the filter information piece, in a manner associated with each other;

a selection unit that selects, from among the plurality of different filter information pieces, a filter information piece whose application target ECU configuration corresponds to an ECU configuration of an ECU installed in the vehicle;

a notification unit that notifies the information processor of a filter version included in the filter information piece selected by the selection unit; and a filter processing unit that judges whether or not the distribution data received from the information processor is to be transferred to the ECU installed in the vehicle based on the filter condition included in the filter information piece selected by the selection unit; and the information processor comprising:

a plurality of distribution data databases having different versions, respectively;

a data distribution unit that selects, among the plurality of distribution data databases, a distribution data database whose version matches with the filter version notified by the notification unit; and a communication unit that transmits the distribution data in the selected distribution data database to the gateway apparatus.

2. The system according to claim 1, wherein the gateway apparatus further comprises a filter update unit that receives distribution of a new filter information piece from the information processor and stores the received new filter information piece in the storage unit.

3. The system according to claim 1, wherein the filter information piece further includes information indicating an application target destination, and the selection unit further selects a filter information piece whose application target destination corresponds to a target destination of the vehicle, from among the plurality of different filter information pieces.

4. The system according to claim 1, wherein the filter information piece further includes information indicating a valid period, and the selection unit selects a filter information piece that satisfies the valid period from among the plurality of different filter information pieces.

5. A communication method performed by a system including a gateway apparatus installed in a vehicle, the gateway apparatus transferring distribution data received from an information processor to an ECU, the method comprising:

storing, in a storage unit, a plurality of different filter information pieces each including an application target ECU configuration including a program version of the ECU, a filter condition indicating a condition to be satisfied for the distribution data to be transferred to the ECU and a filter version of the filter information piece, in a manner associated with each other;

selecting a filter information piece whose application target ECU configuration corresponds to an ECU configuration of an ECU installed in the vehicle from among the plurality of different filter information pieces;

notifying the information processor of a filter version included in the selected filter information piece;

selecting, among a plurality of distribution data databases having different versions included the information processor, a distribution data database whose version matches with the notified filter version;

transmitting the distribution data in the selected distribution data database to the gateway apparatus; and judging whether or not the distribution data received from the information processor is to be transferred to the ECU installed in the vehicle based on the filter condition included in the selected filter information piece.

\* \* \* \* \*

UNITED STATES PATENT AND TRADEMARK OFFICE
CERTIFICATE OF CORRECTION

PATENT NO. : 10,909,050 B2
APPLICATION NO. : 16/353042
DATED : February 2, 2021
INVENTOR(S) : Ouchi et al.

Page 1 of 2

It is certified that error appears in the above-identified patent and that said Letters Patent is hereby corrected as shown below:

In the Specification

In Column 1, Line(s) 65, before "condition", insert --a--.

In Column 2, Line(s) 4, after "vehicle", insert --;--.

In Column 2, Line(s) 16, after "embodiment", delete "," and insert --.--, therefor.

In Column 2, Line(s) 20, before "vehicle", insert --a--.

In Column 2, Line(s) 60, after "center", insert --1--.

In Column 3, Line(s) 25, after "data", delete "OBs" and insert --DBs--, therefor.

In Column 3, Line(s) 36, after "11", insert --,--.

In Column 3, Line(s) 42, after "medium", delete "," and insert --.--, therefor.

In Column 3, Line(s) 43, after "medium", delete ",".

In Column 4, Line(s) 3, delete "ore" and insert --more--, therefor.

In Column 4, Line(s) 38, delete ""storage unit"" and insert --"storage unit."--, therefor.

In Column 5, Line(s) 25, after "version", delete "," and insert --.--, therefor.

In Column 5, Line(s) 35, delete "2, it" and insert --2. It--, therefor.

In Column 5, Line(s) 48, delete "315" and insert --215--, therefor.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,909,050 B2

In Column 5, Line(s) 53, delete "21" and insert --213--, therefor.

In Column 6, Line(s) 6, after "vehicle", insert --2--.

In Column 6, Line(s) 51, before "the", delete "a".

In Column 7, Line(s) 13, after "later", delete ")" and insert --.--, therefor.

In Column 7, Line(s) 19, delete "elected" and insert --selected--, therefor.

In Column 7, Line(s) 44, after "when", delete ";" and insert --:--, therefor.

In Column 8, Line(s) 26, after "transmission", delete ",".

In Column 8, Line(s) 45, delete "SW 21" and insert --GW 21--, therefor.

In Column 8, Line(s) 47, delete "SW 21" and insert --GW 21--, therefor.

In Column 9, Line(s) 2, after "121$_3$", insert --,--.

In Column 9, Line(s) 61, delete "n" and insert --in--, therefor.

In Column 10, Line(s) 6, after "ECU 22,", insert --it--.

In Column 10, Line(s) 33, delete "SW" and insert --GW--, therefor.

In Column 10, Line(s) 49 & 50, delete "rep aced" and insert --replaced--, therefor.